(12) United States Patent
Nozaki et al.

(10) Patent No.: US 6,312,810 B1
(45) Date of Patent: Nov. 6, 2001

(54) FLAME RETARDANT FOR MESH SHEETS AND FLAMEPROOF MESH SHEETS COMPRISING THE SAME

(75) Inventors: Saiji Nozaki, Toyama; Kuniaki Kamiya, Osaka, both of (JP)

(73) Assignees: Saiji Nozaki, Toyama; Kyowa Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 09/205,400

(22) Filed: Dec. 4, 1998

(30) Foreign Application Priority Data

Dec. 5, 1997 (JP) .................................................. 9-366547

(51) Int. Cl.$^7$ ....................................................... B32B 9/04
(52) U.S. Cl. ........................ 428/411.1; 428/365; 428/368; 442/3; 442/27; 442/43; 442/50; 442/54; 442/58
(58) Field of Search ................................ 428/364, 411.1, 428/365, 368, 375; 442/3, 27, 43, 50, 54, 58

(56) References Cited

U.S. PATENT DOCUMENTS

| | | | |
|---|---|---|---|
| 4,877,823 | 10/1989 | Plachetta et al. | 524/80 |
| 5,314,530 | * 5/1994 | Wierer et al. | 106/2 |

FOREIGN PATENT DOCUMENTS

| | | |
|---|---|---|
| 0 505 940 | 9/1992 | (EP) . |
| 0 546 841 | 6/1993 | (EP) . |
| 53-18065 | 5/1978 | (JP) . |
| 52-41786 | 10/1978 | (JP) . |
| 61-9430 | 3/1986 | (JP) . |
| 61-223045 | 10/1986 | (JP) . |

OTHER PUBLICATIONS

Sekisui; "Fire Retard Polyolefin Composition Comprise Polyolefin Red Phosphorus Ammonium Phosphate"; Patent Abstracts of Japan; Oct. 3, 1986.

Kanayama, A., et al., "Recent Trend on Red Phosphorus Group Flame Retardant," Japan Plastics, Vol. 42, No. 2, pp. 74–80 (Feb., 1991).

* cited by examiner

Primary Examiner—Bruce H. Hess
Assistant Examiner—B. Shewareged
(74) Attorney, Agent, or Firm—Rader, Fishman & Grauer

(57) ABSTRACT

The invention relates to a halogen-free flameproof mesh sheet for use outdoors. The flameproof sheet contains a flame retardant which does not have an increase in viscosity during storage, has excellent gloss and flexibility, and does not generate harmful halogen gas at the time of combustion. A mesh sheet woven out of a coated yarn, typically a multifilament fiber, is impregnated with the flame retardant and heat treated. The fabric is impregnated with the flame retardant such that 60–350 parts by weight of the flame retardant is contained with respect to 100 parts by weight of the mesh sheet fabric. The flameproof mesh sheet are suitable for use in building construction and is suitable for outside exposure for extended lengths of time.

15 Claims, No Drawings

FLAME RETARDANT FOR MESH SHEETS AND FLAMEPROOF MESH SHEETS COMPRISING THE SAME

BACKGROUND OF THE INVENTION

The present invention relates to a halogen-free flameproof mesh sheet used outdoors, for example, at a construction site, for a long time.

In recent years, the height or number of stories of buildings is being increased in the construction industry. Meanwhile, the number of houses having a small number of stories is being increased. There buildings or houses must be covered with flameproof mesh sheets for safety and protection, flameproof mesh sheets for few-storied houses, and scattering prevention flameproof mesh sheets, and such regulations are becoming more and more strict.

Currently used flameproof mesh sheets and scattering prevention flameproof mesh sheets are produced by coating multifilament fibers of, for example, polyester, nylon or polypropylene, with a vinyl chloride-based paste resin composition, to prepare original yarn, which is then heated, and, after weaving the yarn into a cloth, heating the cloth to provide a mesh sheet. In another method, a mesh sheet is produced by coating a fabric prepared by weaving multifilament fibers with a vinyl chloride-based paste resin composition, heating the coated fabric, and then forming it into a desired shape.

In the resin composition with which the fibers and fabric are coated, a vinyl chloride resin containing chlorine is used as a resin, and a chlorine-based flame retardant such as chlorinated paraffin, bromine-based flame retardant such as decabromodiphenyl oxide or inorganic flame retardant such as antimony trioxide is used as a flame retardant (as disclosed in Examined Japanese Patent Publication Nos. 52-41786, 53-18065 and 61-9430, Plastics, February, 1991).

In recent years, it has been globally demanded to avoid the use of resins and flame retardants containing elemental halogen which generates harmful gas at the time of combustion, from the viewpoint of the environmental preservation of the earth.

It is proposed in Japanese Laid-open Patent Publicationn No. 61-223045 that red phosphorus and ammonium polyphosphate are kneaded into polyolefin to prevent corrosion caused by halogen contained in a flame retardant made of a halogen-containing compound. However, there has not been known a flame retardant prepared by dispersing red phosphorus and ammonium phosphate in an aqueous dispersion of an ethylene-vinyl acetate copolymer, or an aqueous dispersion comprising the above aqueous dispersion and an aqueous dispersion of an α-olefin copolymer and/or an aqueous dispersion of polyurethane.

The inventor of the present invention has proposed in Japanese Patent Application No. 9-225464 a halogen-free flame retardant comprising an aqueous dispersion of a polyolefin resin as a flame retardant. This flame retardant yields an excellent effect, but its viscosity tends to increase due to chronological changes during storage thereof.

The inventor of the present invention has also proposed in Japanese Patent Application No. 9-312550 a halogen-free flame retardant comprising an aqueous dispersion of an ethylene-vinyl acetate copolymer containing 10 to 90 parts by weight of vinyl acetate. While this flame retardant has excellent effect and function, the present invention provides further improvements in the gloss, flexibility and flame retardancy over the proposed flame retardant. Flameproof mesh sheets having significantly improved gloss and flexibility have been strongly desired depending upon the field in which the sheets are used.

SUMMARY OF THE INVENTION

The present invention has been developed in view of the above situations. It is therefore an object of the present invention to provide a flame retardant for halogen-free flameproof mesh sheets, which does not suffer from an increase in its viscosity during storage, has excellent gloss and flexibility, and does not generate harmful halogen gas at the time of combustion, and to provide a flameproof mesh sheet using the flame retardant.

The present invention relates to a flame retardant for mesh sheets, which is prepared by mixing 1.5 to 15 parts by weight of red phosphorus, 10 to 50 parts by weight of an ammonium polyphosphate compound, and 3 to 30 parts by weight of an organic phosphate, with 100 parts by weight of the solid content of an aqueous dispersion of an ethylene-vinyl acetate copolymer having a vinyl acetate content of 10 to 95 wt % and a resin solid content of 25 to 75 wt %.

The present invention also relates to a flame retardant for mesh sheets, which is prepared by mixing an aqueous dispersion of an α-olefin copolymer having a solid content of 20 to 45 wt %, with an aqueous dispersion of an ethylene-vinyl acetate copolymer having a vinyl acetate content of 10 to 95 wt % and a resin solid content of 25 to 75 wt %, in a solid content weight ratio of 10:90 to 70:30, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content. Furthermore, the present invention relates to a flame retardant for mesh sheets, which is prepared by mixing an aqueous dispersion of polyurethane having a solid content of 25 to 70 wt %, with an aqueous dispersion of an ethylene-vinyl acetate copolymer having a vinyl acetate content of 10 to 95 wt % and a resin solid content of 25 to 75 wt %, in a solid content weight ratio of 10:90 to 90:10, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content.

Also, the present invention relates to a flame retardant for mesh sheets prepared by mixing an aqueous dispersion of an α-olefin copolymer having a solid content of 20 to 45 wt % and an aqueous dispersion of polyurethane having a solid content of 25 to 70 wt %, with an aqueous dispersion of an ethylene-vinyl acetate copolymer having a vinyl acetate content of 10 to 95 wt % and a resin solid content of 25 to 75 wt %, in a solid content weight ratio of 10:10:80 to 50:80:10, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content.

The red phosphorus and ammonium polyphosphate compound as indicated above may be micro-capsulated.

The present invention also relates to a flameproof mesh sheet produced by weaving yarn comprising, for example, multifilament fibers, which yarn is impregnated and coated with the flame retardant for mesh sheets of the present invention.

PREFERRED EMBODIMENTS OF THE INVENTION

According to the present invention, an aqueous dispersion of an ethylene-vinyl acetate copolymer is used as a base material because multifilament fibers and fabric are fully impregnated with a flame retardant and uniformly coated with the flame retardant. The aqueous dispersion makes impregnation and coating easy.

The ethylene-vinyl acetate copolymer used in the present invention desirably contains 10 to 95 wt % of vinyl acetate, and the aqueous dispersion of the ethylene-vinyl acetate copolymer preferably has a solid content of 27 to 75 wt %, a particle diameter of 0.1 to 15 μm, a viscosity of 50 to 9,000 cp and a pH of 4 to 9. For instance, V-200 and V-100 (manufactured by Mitsui Petrochemical Industries, Ltd.), S-301, S-500, S-706, S-751 and S-752 (of Sumitomo Chemical Company, Ltd.), and others are suitably used.

Since the ethylene-vinyl acetate copolymer has a group represented by —OCO—$CH_3$ and a large amount of oxygen, the copolymer, when used in combination with red phosphorus and ammonium polyphosphate, provides a great flame retarding effect.

In the present invention, an α-olefin copolymer can be used along with the aqueous dispersion of the ethylene-vinyl acetate copolymer. A dispersion of the α-olefin copolymer preferably has a solid content of 20 to 45 wt %, a particle diameter of 1 to 10 μm, a pH of 8 to 11, a viscosity of 2,000 to 8,000 cp (a BM type viscometer, 6 rotations) and a resin surface hardness of A-80 to 97 (Shore A: ASTMD). The α-olefin copolymer is preferably a thermoplastic elastomer resin containing ethylene in an amount of 50 wt % or more. For example, A-100 or A-200 (manufactured by Mitsui Petrochemical Industries, Ltd.) may be suitably used.

The aqueous dispersion of the ethylene-vinyl acetate copolymer has an excellent retarding effect, and its viscosity is less likely to increase due to chronological changes, thus permitting the dispersion to be stored in good conditions. However, the feeling of the mesh sheet treated with this dispersion is slightly hard.

When an aqueous dispersion of an α-olefin copolymer is used along with the above dispersion to improve the feeling, the resulting mesh sheet provides a soft feeling. The amount of the α-olefin copolymer is 10 to 70 wt % with respect to 90 to 30 wt % of the solid content of the ethylene-vinyl acetate copolymer. If the amount is smaller than 10 wt %, the feeling is improved only by a small degree, and, if the amount is larger than 70 wt %, the ability to prevent flame deteriorates disadvantageously.

A polyurethane aqueous dispersion is most preferably used along with the ethylene-vinyl acetate copolymer to improve the feeling, since the resulting mesh sheet provides a soft feeling and improved gloss.

The amount of polyurethane is 10 to 90 wt % with respect to 90 to 10 wt % of the solid content of the ethylene-vinyl acetate copolyrner. If the amount is smaller than 10 wt %, the feeling and gloss are improved only by small degrees, and, if the amount is larger than 90 wt %, the ability to prevent flame deteriorates disadvantageously. While the polyurethane used herein may be selected from those having the main structure of polyester, polyol or polycarbonate, polyurethane having the main structure of polyester is preferably used in view of its flexibility, water resistance, adhesion and other properties.

The polyurethane aqueous dispersion used in the present invention preferably has a solid content of 25 to 70 wt %, a particle diameter of 0.01 to 10 μm, a viscosity of 10 to 3,000 cp and a pH of 4 to 9. For example, the polyurethane aqueous dispersion is selected from Despacol U-42 and Despacol KA8481 manufactured by Sumitomo Viel Urethane Co., Adecabontiter HUX-380, Adecabontiter HUX-232, Adecabontiter HUX-290H, Adecabontiter HUX-350 and Adecabontiter HUX-386H manufactured by Asahi Denka Kogyo Co., Letan WB manufactured by Kansai Paint Co., and others.

The present invention is also concerned with a flame retardant comprising an aqueous dispersion of an ethylene-vinyl acetate copolymer, an aqueous dispersion of an α-olefin in copolymer and an aqueous dispersion of polyurethane.

As for the contents of the α-olefin copolymer and the polyurethane, the α-olefin copolymer is used in an amount of 10 to 50 wt % and the polyurethane is used in an amount of 10 to 70 wt %, with respect to 80 to 10 wt % of the solid content of the ethylene-vinyl acetate copolymer. If the amount of the α-olefin copolymer is smaller than 10 wt %, the feeling improves only by a small degree, and, if the amount is larger than 50 wt %, the use of the α-olefin copolymer with polyurethane undesiraly result in deterioration in the flame-proofing capability. If the amount of the polyurethane is smaller than 10 wt %, the feeling and gloss improve only by small degrees, and, if the amount is larger than 70 wt %. the use of polyurethane along with the α-olefin copolymer undesirably results in deterioration in the flame-proofing capability, The flame retardant of the present invention contains red phosphorus in an amount of 1.5 to 15 parts by weight with respect to 100 parts by weight of the total resin solid content. If the amount of red phosphorus is smaller than 1.5 parts by weight, its flame retarding effect is small, and, when the amount is larger than 15 parts by weight, the product has a strong red tint, which is deemed undesirable.

Red-phosphorus used in the present invention is preferably micro-capsulated. The use of the micro-encapsulated red phosphorus makes it possible to reduce an increase in the viscosity of an aqueous dispersion when red phosphorus is mixed into the olefin aqueous dispersion. After the flame-proof mesh sheet that is spread over the construction site is used for 4 to 8 months, the sheet is detached and washed so that dirt is removed. The washing is carried out by immersing the mesh sheet for several hours, in hot water of about 40° C. that contains a detergent. At this point, red phosphorus contained in microcapsules can be prevented from dissolving in water. The concentration of red phosphorus is 75 to 95%, and the average particle diameter thereof is 10 to 40 μm.

Micro-capsulation can be suitably carried out by coating the surfaces of red phosphorus particles with a resin or inorganic material, by interfacial polymerization, coacervation or the like.

The ammonium polyphosphate compound used in the present invention is ammonium polyphosphate or amide polyphosphate. By using the ammonium polyphosphate compound contained in microcapsules, it is possible to reduce an increase in the viscosity of the aqueous dispersion when the ammonium polyphosphate compound is mixed into the aqueous dispersion of an olefin resin. After the flameproof mesh sheet that is spread over the construction site is used for 4 to 8 months, the sheet is detached and washed so that dirt is removed. The washing is carried out by immersing the mesh sheet for several hours, in hot water of about 40° C. that contains a detergent. At this point, the ammonium polyphosphate compound contained in microcapsules hardly dissolves in water, but is kept stable. The concentration of phosphorus contained in the ammonium polyphosphate compound is 15 to 35%, and the average particle diameter thereof is 5 to 40 μm. Micro-capsulation can be carried out in the same manner as in the case of red phosphorus.

The flame retardant of the present invention contains an ammonium polyphosphate compound in an amount of 10 to 50 parts by weight, with respect to 100 parts by weight of the total resin solid content. If the amount of the ammonium polyphosphate compound is smaller than 10 parts by weight, its flame retarding effect is reduced. If the ammonium polyphosphate compound is used with an organic phosphate, and the amount of the ammonium polyphosphate compound is larger than 50 parts by weight, there is no further improvement in its flame retarding effect. Thus, it is not necessary to add a large amount of the ammonium polyphosphate compound.

The flame retardant of the present invention contains an organic phosphate in an amount of 3 to 30 parts by weight with respect to 100 parts by weight of the total resin solid content. If the amount of the organic phosphate is smaller than 3 parts by weight, its flame retarding effect is undesirably small, and the gloss and flexibility improve only by small degrees. If the amount is larger than 30 parts by weight, the flame retarding effect improves only by a small degree, and the product becomes sticky, which is considered undesirable.

The organic phosphate is a halogen-free organic phosphate having an elemental phosphorus content of 7 to 18 wt % and a viscosity (20° C.) of 10 to 150 cp. The organic phosphate used in the present invention is preferably allyl phosphate because it has a good flame retarding effect, high compatibility with resins, and good plasticity.

The red phosphorus and ammonium polyphosphate compound are used in the flame retardant of the present invention because when a resin composition containing red phosphorus is brought close to flame, the resin and red phosphorus on the surface first burn, and the resin is bonded to oxygen in the air to provide carbon dioxide gas, water and carbon. In this case, the red phosphorus accelerates carbonization of the ethylene-vinyl acetate copolymer and the α-olefin copolymer, and/or polyurethane. Meanwhile, the red phosphorus is bonded to oxygen to provide an oxide which is further bonded to water to provide condensation phosphoric acid. A mixture of carbon and condensation phosphoric acid formed on the surface of the resin forms an oxygen impermeable layer on the surface of the resin, which layer suppresses combustion of the resin and makes the resin flame resistant. Therefore, the ethylene-vinyl acetate copolymer containing a large amount of oxygen is effective in forming condensation red phosphoric acid. The red phosphorus needs to be contained in an amount of 1.5 to 15 parts by weight with respect to 100 parts by weight of the solid content of the aqueous dispersion of the ethylene-vinyl acetate copolymer having a solid content of 20 to 75 wt %. If the content of red phosphorus is less than 1.5 parts by weight with respect to the resin solid content, its flame retarding effect is not provided, and, if the content exceeds 15 parts by weight, its flame retarding effect is not improved any more, and the resulting flameproof mesh sheet has a strong red tint and is difficult to be colored even with a pigment.

In this case, an ammonium polyphosphate compound, if any, thermally decomposes at the time of combustion, and generates nitrogen gas which shuts off oxygen. The ammonium polyphosphate compound accelerates the carbonization of the ethylene-vinyl acetate copolymer as a dehydrocarbonizing agent to thus improve a flame retarding effect. while generating nitrogen-containing gas. In the present invention, the ammonium polyphosphate compound needs to be contained in an amount of 15 to 50 parts by weight with respect to 100 parts by weight of the solid content of the aqueous dispersion of ethylene-vinyl acetate copolymer having a solid content of 20 to 75%. If the content is below 15 parts by weight, a desired flame retarding effect is not provided, and, if the content is above 50 parts by weight, the flame retarding effect is not further improved when the ammonium polyphosphate compound is used along with an organic phosphate. When an α-olefin copolymer and polyurethane are also used, the above-indicated contents of red phosphorus, ammonium polyphosphate and organic phosphate are determined on the basis of 100 parts by weight of the total resin solid content.

For example, Nova Excel 140 or Nova Red 120 (Rin Kagaku Kogyo Co.) may be used as red phosphorus.

For example, TERRAJU-60 or TERRAJU-70 (manufactured by Chisso Corp.) or Hostafuram AP462 (manufactured by Hoechst Japan Co.) may be used as the ammonium polyphosphate compound.

For example, TCP, CDP or TOP (manufactured by Daihachi Kagaku Co.) may be used as the organic phosphate.

When a metal hydroxide is used in addition, the resulting flame retardant advantageously provides a great flame retarding effect. The metal hydroxide is preferably selected from magnesium hydroxide and aluminum hydroxide, which can be used along with red phosphorus and ammonium polyphosphate to provide a greater effect. While the product becomes hard if the metal hydroxide is added to the flame retardant, a phosphate advantageously makes the product soft. The metal hydroxide needs to be contained in an amount of 30 to 150 parts by weight with respect to 100 parts by weight of the total resin solid content of the aqueous dispersion of the ethylene-vinyl acetate copolymer, the α-olefin resin and the polyurethane.

When the amount of the metal hydroxide is smaller than 30 parts by weight with respect to the resin solid content, it provides a reduced effect to enhance flame retardation, and, if the amount is larger than 150 parts by weight, the viscosity of the aqueous dispersion of the ethylene-vinyl acetate copolymer undesirably increases.

For example, Hijilite H-42M or Hijilite H-43M (manufactured by Showa Denko K.K.) may be used as aluminum hydroxide.

For example, Kisuma 5 (manufactured by Kyowa Kagaku Kogyo Co.) may be used as magnesium hydroxide.

Next, there will be described a flameproof mesh sheet comprising the flame retardant of the present invention.

The multifilament used in the present invention comprises at least one selected from polyester, nylon, polypropylene and vinylon. In particular, polyester fibers are preferable in terms of the strength and thermal shrinkage.

A high-strength and lightweight flameproof mesh sheet can be obtained by controlling the tensile strength of the multifilament to 4 to 10 g/denier. A flameproof mesh sheet having high toughness and high impact energy absorption upon falling thereof can be obtained by controlling the elongation of the multifilament at the point of tensile rupture, to 14 to 45%.

The multifilament which is woven after being treated with a flame retardant has an equivalent single fineness of 3 to 17 denier, preferably 3 to 12 denier, particularly preferably 4 to 9 denier, and a total fineness of 500 to 4,500 denier, preferably 1,000 to 3,500 denier, particularly preferably 1,500 to 3,000 denier.

The multifilament which is woven into a fabric that is then treated with a flame retardant has an equivalent single fineness of 2 to 13 denier, preferably 2 to 11 denier, particularly preferably 2.5 to 9 denier, and a total fineness of 150 to 2,500 denier, preferably 200 to 2,000 denier, particularly preferably 250 to 1,500 denier. The strength of the flameproof mesh sheet can be increased and its weight can be reduced by controlling the tensile strength to 4 to 10 g/denier. The toughness of the flameproof mesh sheet can be increased and the impact energy absorption upon falling thereof can be improved by controlling elongation at the tensile rupture point to 14 to 45%.

A flameproof mesh sheet which needs to have high strength and toughness is prepared by arranging 1 to 4 filament fibers in parallel and performing mock leno weave with a Dobby weaving machine. A scattering prevention flameproof mesh sheet is often prepared by performing mock leno weave from one fiber with a weaving machine. A flameproof mesh sheet for low houses is prepared by leno weaving 1 to 4 filament fibers into a fabric.

As for the solid content weight ratio of the flame retardant to the multifilament fiber or fabric, the flame retardant is used in an amount of 60 to 250 parts by weight with respect to 100 parts by weight of the multifilament fiber or fabric. If the solid content of the flame retardant is less than 60 parts by weight with respect to 100 parts by weight of the multifilament fiber or fabric, the fiber or fabric is non-uniformly coated with the flame retardant, and the base of the multifilament fiber or fabric may be partly exposed, resulting in deterioration in the outer appearance and weatherability. Further, the ability to prevent flame also deteriorates. If the solid content is more than 250 parts by weight, the weight of the flameproof mesh sheet undesirably increases, resulting in reduced handling ease.

The flame retardant of the present invention may be used along with suitably selected types and amounts of pigment, dye, plasticizer, ultraviolet absorber, optical stabilizer, antioxidant, stabilizer, diluent, thickening agent, foaming agent, mold preventing agent, alga preventing agent, and other agents.

Next, a method of producing the flameproof mesh sheet of the present invention will be described. Where the flameproof mesh sheet of the present invention is produced using multi-filament fibers, the fibers are coated with with the flame retardant through a sizing nozzle, and, after gelation by heating, the coated yarm is taken up by a winder. This coated yarn taken up on the winder is woven into a fabric by a weaving machine. This fabric is introduced into a heating furnace, and heated for non-shifting processing in order to obtain a whole cloth.

The whole cloth is cut to a predetermined size, sewed and subjected to non-shifting processing to provide a halogen-free flameproof mesh sheet.

Where the flameproof mesh sheet of the present invention is produced using a fabric, a woven whole cloth is formed by weaving multi-filament fibers with a Dobby weaving machine. After the woven whole cloth is immersed in and passed through a tank filled with a flame retardant for mesh sheets, the cloth is dried with an air blow, introduced into a heating furnace, and heated for gelation to obtain a coated cloth. To increase the amount of the flame retardant applied by coating to the cloth, the cloth is repeatedly immersed in and passed through the tank filled with the flame retardant at least twice, to produce the coated cloth. The cloth is cut to a predetermined size, sewed and subjected to non-shifting processing, to provide a halogen-free flameproof mesh sheet.

EXAMPLES

Example 1

250 parts by weight of an aqueous dispersion of an ethylene-vinyl acetate copolymer V-200 (having a vinyl acetate content of 19 wt % and a solid content of 40 wt %, manufactured by Mitsui Petrochemical Industries, Ltd.) was injected into a planetary mixer (having a volume of 25 liters), and then 6 parts by weight of red phosphorus Nova Excel 140, 30 parts by weight of ammonium polyphosphate TERRAJU-60 (manufactured by Chisso Corp.), 10 parts by weight of phosphate TCP (manufactured by Daihachi Kagaku Co.), 0.8 part by weight of ultraviolet absorber Tinuabin 327 (manufactured by Chiba Geigy Co.), 0.8 part by weight of an antioxidant Irganox 1010 (manufactured by Chiba Geigy Co.), 1.0 part by weight of an optical stabilizer HALS (manufactured by Chiba Geigy Co.) and 1.0 part by weight of titanium oxide were added little by little over about 5 minutes under agitation. Then, 10 parts by weight of isopropyl alcohol was then added. After the addition, these materials were stirred for another 20 minutes. Then, vacuum defoaming was carried out at a reduced pressure of 5 mmHg for about 30 minutes to obtain a flame retardant for mesh sheets having a viscosity of 2,850 cp (a BM type viscometer, rotor V-6, 12 rpm, 25° C.). The flame retardant was put into a bath, and a polyester multi-filament fiber consisting of 384 filaments and having a total fineness of 1,750 denier, an equivalent single fineness of 4.5 denier, a tensile strength of 8.5 g/denier and an elongation of 21% at a point of tensile rupture was caused to pass through a guide, pinched with a pinch roll, and guided by a guide roll to pass through the bath of the flame retardent, and then through a sizing nozzle (diameter of 0.7 mm) so that the multifilament was coated with the flame retardant. Thereafter, the obtained strand was heated in a heating furnace at 150° C. and caused to 5 pass through another sizing nozzle (diameter of 0.8 mm) so that the multifilament was further coated with the flame retardant. The strand was then heated in a heating furnace at 180° C. to provide coated yarn of 3,820 denier. The weight ratio of the flame retardant for mesh sheets to the multi-filament fiber was 118/100.

Thereafter, the coated yarn was woven into a mesh plain weave fabric of 52 warps/10 cm and 52 wefts/10 cm with a rapier loom at a speed of 50 cm/min. This fabric was then heated in a heating furnace at 160° C. so that intersecting points between the warps and wefts were thermally fused, to thus provide a flameproof mesh sheet according to the present invention. Further, the whole cloth was cut to a width of 190 cm and a length of 520 cm, sewed with a sewing machine and subjected to non-shifting processing, to obtain a flameproof mesh sheet having a width of 180 cm and a length of 510 cm.

The composition of the flame retardant is shown in Table 1 and the measurement results of the properties of the flameproof mesh sheet treated with the flame retardant are shown in Table 3.

Example 2

A flame retardant having a viscosity of 1,530 cp was obtained in the same manner as in Example 1 except that 200 parts by weight of an ethylene-vinyl acetate copolymer S-752 (having a vinyl acetate content of 90 wt % and a solid content of 50 wt %, manufactured by Sumitomo Chemical Company, Ltd.) was used in place of the ethylene-vinyl acetate copolymer V-200, and isopropyl alcohol was not added.

A multi-filament fiber of 3,000 denier was used to obtain coated yarn of 5,676 denier by using the first sizing nozzle having a diameter of 0.8 mm, and the second sizing nozzle having a diameter of 0.9 mm.

A flameproof mesh sheet was obtained in the same manner as in Example 1 except that the coated yarn was formed into 30 warps/10 cm and 30 wefts/10 cm.

The composition of the flame retardant is shown in Table 1, and the measurement results of the properties of the flameproof mesh sheet treated with the flame retardant are shown in Table 3.

Example 3

A flameproof mesh sheet was obtained in the same manner as in Example 1 except that 175 parts by weight of an ethylene-vinyl acetate copolymer V-200 (having a vinyl acetate content of 19 wt % and a solid content of 40 wt %, manufactured by Mitsui Petrochemical Industries, Ltd.) and 75 parts by weight of the α-olefin copolymer (having a solid content of 40 wt %, manufactured by Mitsui Petrochemical Industries, Ltd.) were used in place of the ethylene-vinyl acetate copolymer used in Example 1. The composition of the flame retardant is shown in Table 1, and the measurement results of the properties of the flameproof mesh sheet treated with the flame retardant are shown in Table 3.

Example 4

A flameproof mesh sheet was obtained in the same manner as in Example 1 except that 125 parts by weight of an ethylene-vinyl acetate copolymer V-200 (having a vinyl acetate content of 19 wt % and a solid content of 40 wt %, manufactured by Mitsui Petrochemical Industries Ltd.) and 100 parts by weight of polyurethane Despacol U-42 (having the main structure of polyester, and a solid content of 50 wt %, manufactured by Sumitomo Viel Urethane Co.) were used, and isopropyl alcohol was not added.

The composition of the flame retardant is shown in Table 1, and the measurement results of the properties of the flameproof mesh sheet treated with the flame retardant are shown in Table 3.

Example 5

A flameproof mesh sheet was obtained in the same manner as in Example 1 except that 150 parts by weight of ethylene-vinyl acetate copolymer V-200 (having a vinyl acetate content of 19 wt % and a solid content of 40 wt %, manufactured by Mitsui Petrochemical Industries, Ltd.), 50 parts by weight of α-olefin copolymer (having a solid content of 40 wt %, manufactured by Mitsui petrochemical Industries, Ltd.), and 40 parts by weight of polyurethane Adecabontine HUX-380 (having the main structure of polyester and a solid content of 38 wt %, manufactured by Asahi Denka Kogyo Co.) were used, and isopropyl alcohol was not added.

The composition of the flame retardant is shown in Table 1, and the measurement results of the properties of the flameproof mesh sheet treated with the flame retardant are shown in Table 3.

Example 6

A flame retardant for mesh sheets was obtained in the same manner as in Example 1 except that 100 parts by weight of an ethylene-vinyl acetate copolymer S-752 (having a vinyl acetate content of 90 wt % and a solid content of 50 wt %, manufactured by Sumitomo Chemical Company, Ltd.) was used in place of the ethylene-vinyl acetate copolymer V-200 (having a vinyl acetate content of 19 wt % and a solid content of 40 wt %, manufactured by Mitsui Petrochemical Industries, Ltd.), and 138 parts by weight of polyurethane Adecabontiter HUX-380 (having the main structure of a polyester and a solid content of 38 wt %, manufactured by Asahi Denka Kogyo Co.) and 20 parts by weight of organic phophoate TCP were added, while isopropyl alcohol was not added. The composition of the flame retardant is shown in Table 2.

To coat a fabric with the flame retardant, instead of using the multifilament fiber as in Example 1, three multifilament fibers of 750 denier were arranged in parralel, and a mock leno weave fabric of 45 warps/10 cm and 45 wefts/10 cm was woven with a Dobby weaving machine. The weight of the fabric was 225 g/m$^2$.

Thereafter, the fabric was caused to pass through a guide roll into a tank filled with the flame retardant, pinched with a pinch roll, guided by a guide roll to pass through the flame retardant in the tank, squeezed with a squeezing roll. After drying with an air blow to remove the flame retardant that clogs the mesh of the fabric, the fabric was placed in a heating furnace having a temperature gradient of 130° C., 160° C. and 180° C., for gelation, and the coated whole cloth was taken up by a winder. The coated whole cloth was caused to pass through a tank filled with the flame retardant, and the same procedure was repeated twice to obtain a coated whole cloth having a coating amount of 392 g/m$^2$ (mesh sheet cloth). The cloth was cut to a predetermined size, sewed and subjected to non-shifting processing to obtain a flameproof mesh sheet. The properties of the mesh sheet are shown in Table 4.

Example 7

Three multifilament fibers of 750 denier were arranged in parallel, and a leno weave fabric of 20 warps/10 cm and 20 wefts/10 cm was woven with a weaving machine. The weight of the coated fabric was 90 g/m$^2$.

The fabric was coated with the same flame retardant as in Example 6 in the same manner as in Example 6, and heated for gelation, and the resulting coated cloth having a weight of 185 g/m$^2$ was taken up by a winder. This coated cloth was cut to a predetermined size, sewed and subjected to non-shifting processing to obtain a flameproof mesh sheet for houses having a small number of stories.

The composition of the flame retardant used is shown in Table 2, and the measurement results of the properties of the flameproof mesh sheet for low houses treated with the flame retardant are shown in Table 4.

Example 8

To coat a fabric with the flame retardant as in Example 6, instead of coating the multifilament fiber with the flame retardant, a mock leno weave fabric of 120 warps/10 cm and 120 wefts/10 cm was woven with a Dobby weaving machine, using one multifilament fiber of 250 denier. The weight of the fabric was 66 g/m$^2$.

Thereafter, the fabric was coated with the same flame retardant for mesh sheets as used in Example 6 in the same manner as in Example 6, and heated for gelation, and the coated whole cloth having a weight of 117 g/m$^2$ was taken up by a winder.

The cloth was cut to a predetermined size, sewed, and subjected to non-shifting processing to obtain a scattering prevention flameproof mesh sheet.

The composition of the flame retardant used is shown in Table 8, and the measurement results of the properties of the scattering prevention flameproof mesh sheet treated with the flame retardant are shown in Table 4.

Example 9

A flame retardant for mesh sheets was produced in the same manner as in Example 1 except that 100 parts by weight of an ethylene-vinyl acetate copolymer S-301 (having a vinyl acetate content of 80 wt % and a solid content of 50 wt %) was used in place of the ethylene-vinyl acetate copolymer V-200 (having a vinyl acetate content of 19 wt % and a solid content of 40 wt %) as used in Example 1, and 167 parts by weight of polyurethane Adecabontiter HUX-350 (having the main structure of polyester and a solid content of 30 wt %), 3 parts by weight of red phosphorous Nova Red 120, 30 parts by weight of ammonium polyphosphate Hostafuram AP-462, 20 parts by weight of organic phosphate CDP (manufactured by Daihachi Kagaku Co.), and 100 parts by weight of ammonium hydroxide Hijilite H-42H were added.

A flameproof mesh sheet was obtained in the same manner as in Example 1 except that the above flame retardant was used.

The composition of the flame retardant used is shown in Table 2, and the measurement results of the properties of the flameproof mesh sheet treated with the flame retardant are shown in Table 4.

Example 10

A flame retardant for mesh sheets was produced in the same manner as in Example 1 except that 100 parts by weight of an ethylene-vinyl acetate copolymer S-301 (having a vinyl acetate content of 80 wt % and a solid content of 50 wt %) was used in place of the ethylene-vinyl acetate copolymer V-200 (having a vinyl acetate content of 19 wt % and a solid content of 40 wt %) as used in Example 1, and 161 parts by weight of polyurethane Adecabontiter HUX-386 (having the main structure of a polycarbonate and a solid content of 31 wt %), 12 parts by weight of red phosphorus Nova Red 120, 20 parts by weight of ammonium polyphosphate Hostafuram AP-462, 20 parts by weight of organic phosphate CDP, and 100 parts by weight of magnesium hydroxide Kisuma-5 were added.

The composition of the flame retardant is shown in Table 2, and a flameproof mesh sheet was obtainedlin the same manner as in Example 1 except that the above flame retardant was used.

The measurement results of the properties of the flameproof mesh sheet are shown in Table 4.

Comparative Example 1

A flame retardant having a viscosity of 2,950 cps was obtained in the same manner as in Example 1 except that the organic phosphate TCP as used in Example 1 was not added. A flameproof mesh sheet was produced in the same manner as in Example 1 except that the above flame retardant was used.

The composition of the flame retardant is shown in Table 5, and the measurement results of the properties of the flameproof mesh sheet treated with the flame retardant are shown in Table 7.

Comparative Example 2

A flame retardant having a viscosity of 3,420 cps was obtained in the same manner as in Example 3 except that the organic phosphate TCP as used in Example 3 was not added. A flameproof mesh sheet was produced in the same manner as in Example 3 except that the above flame retardant was used.

The composition of the flame retardant is shown in Table 5, and the measurement results of the properties of the flameproof mesh sheet treated with the flame retardant are shown in Table 6.

Comparative Example 3

A flame retardant having a viscosity of 3,270 cps was obtained in the same manner as in Example 4 except that the organic phosphate TCP as used in Example 4 was not added. A flameproof mesh sheet was produced in the same manner as in Example 4 except that the above flame retardant was used.

The composition of the flame retardant is shown in Table 5, and the measurement results of the properties of the flameproof mesh sheet treated with the flame retardant are shown in Table 7.

Comparative Example 4

A flame retardant having a viscosity of 2,860 cps was obtained in the same manner as in Example 1 except that the content of the red phosphorus Nova Excel 140 was changed to 1.0 part by weight. A flameproof mesh sheet was produced in the same manner as in Example 1 except that the above flame retardant was used.

The composition of the flame retardant is shown in Table 5, and the measurement results of the properties of the flameproof mesh sheet treated with the flame retardant are shown in Table 7.

Comparative Example 5

A flame retardant having a viscosity of 2,430 cps was obtained in the same manner as in Example 1 except that the content of red phosphorus Nova Excel 140 was changed to 12 parts by weight, and the content of ammonium polyphosphate TERRAJU-60 was changed to 8 parts by weight. A flameproof mesh sheet was produced in the same manner as in Example 1 except that the above flame retardant was used.

The composition of the flame retardant is shown in Table 5, and the measurement results of the properties of the flameproof mesh sheet treated with the flame retardant are shown in Table 7.

Comparative Example 6

A flame retardant having a viscosity of 1,860 cps was obtained in the same manner as in Example 1 except that 40 parts by weight of organic phosphate TCP was added, and isopropyl alcohol was not added. A flameproof mesh sheet was produced in the same manner as in Example 1 except that the above flame retardant was used.

The composition of the flame retardant is shown in Table 6, and the measurement results of the properties of the flameproof mesh sheet treated with the flame retardant are shown in Table 8.

Comparative Example 7

A flame retardant having a viscosity of 2,880 cps was obtained in the same manner as in Example 1 except that 2 parts by weight of organic phosphate TCP was added. A flameproof mesh sheet was produced in the same manner as in Example 1 except that the above flame retardant was used.

The composition of the flame retardant is shown in Table 6, and the measurement results of the properties of the flameproof mesh sheet treated with the flame retardant are shown in Table 8.

Comparative Example 8

A flame retardant having a viscosity of 2,580 cps was obtained in the same manner as in Example 1 except that red phosphorus, ammonium polyphosphate, and phosphate were not used, but 20 parts by weight of antimony trioxide and 25 parts by weight of decabromodiphenyl oxide were used, while isopropyl alcohol was not added. A flameproof mesh sheet was produced in the same manner as in Example 1 except that the above flame retardant was used.

The composition of the flame retardant is shown in Table 6, and the measurement results of the properties of the flameproof mesh sheet treated with the flame retardant are shown in Table 8.

Comparative Example 9

Coated yarn of 2,557 denier was obtained by coating a multifilament fiber with the flame retardant, using a 0.6 mm-diameter sizing nozzle in place of the 0.7 mm-diameter sizing nozzle as used in Example 1. A flameproof mesh sheet was produced in the same manner as in Example 1, using the coated yarn that was not coated with the flame retardant twice.

The composition of the flame retardant is shown in Table 6, and the measurement results of the properties of the flameproof mesh sheet treated with the flame retardant are shown in Table 8.

TABLE 1

|  | solid content % | Example 1 | Example 2 | Example 3 | Example 4 | Example 5 |
|---|---|---|---|---|---|---|
| Aqueous dispersion resin ethylene-vinyl acetate copolymer |  |  |  |  |  |  |
| V-200 | 40 | 250 |  | 175 | 125 | 150 |
| S-752 | 50 |  | 200 |  |  |  |
| S-301 | 50 |  |  |  |  |  |
| ethylene-α-olefin copolymer A-100 | 40 |  |  | 75 |  | 50 |
| polyurethane |  |  |  |  |  |  |
| Despacol U-42 | 50 |  |  |  | 100 |  |
| Adecabontiter HUX-380 | 38 |  |  |  |  | 40 |
| Adecabontiter HUX-350 | 30 |  |  |  |  |  |
| Adecabontiter HUX-386 | 31 |  |  |  |  |  |
| aqueous dispersion resin solid content (parts by weight) |  | 100 | 100 | 100 | 100 | 100 |
| phosphate TCP |  | 10 | 10 | 10 | 10 | 10 |
| phosphate CDP |  |  |  |  |  |  |
| red phosphorus Nova Excel 140 |  | 6 | 6 | 6 | 6 | 6 |
| red phosphorus Nova Red 120 |  |  |  |  |  |  |
| ammonium polyphosphate A |  | 30 | 30 | 30 | 30 | 30 |
| ammonium polyphosphate B |  |  |  |  |  |  |
| aluminum hydroxide C |  |  |  |  |  |  |
| magnesium hydroxide D |  |  |  |  |  |  |
| isopropyl alcohol |  | 10 |  | 10 |  |  |
| viscosity of aqueous dispersion (CP) |  | 2850 | 1530 | 2920 | 2640 | 2170 |

TABLE 2

|  | Example 6 | Example 7 | Example 8 | Example 9 | Example 10 |
|---|---|---|---|---|---|
| Aqueous dispersion resin ethylene-vinyl acetate copolymer |  |  |  |  |  |
| V-200 |  |  |  |  |  |
| S-752 | 100 | 100 | 100 |  |  |
| S-301 |  |  |  | 100 | 100 |
| ethylene-α-olefin copolymer A-100 |  |  |  |  |  |
| polyurethane |  |  |  |  |  |
| Despacol U-42 |  |  |  |  |  |
| Adecabontiter HUX-380 | 138 | 138 | 138 |  |  |
| Adecabontiter HUX-350 |  |  |  | 167 |  |
| Adecabontiter HUX-386 |  |  |  |  | 161 |
| aqueous dispersion resin solid content (parts by weight) | 100 | 100 | 100 | 100 | 100 |
| phosphate TCP | 20 | 20 | 20 |  |  |
| phosphate CDP |  |  |  | 20 | 20 |
| red phosphorus Nova Excel 140 | 6 | 6 | 6 |  |  |
| red phosphorus Nova Red 120 |  |  |  | 3 | 12 |
| ammonium polyphosphate A | 30 | 30 | 30 |  |  |
| ammonium polyphosphate B |  |  |  | 30 | 20 |
| aluminum hydroxide C |  |  |  | 100 |  |
| magnesium hydroxide D |  |  |  |  | 100 |
| isopropyl alcohol |  |  |  | 10 | 10 |
| viscosity of aqueous dispersion (CP) | 790 | 790 | 790 | 2730 | 2840 |

TABLE 3

|  | solid content % | Example 1 | Example 2 | Example 3 | Example 4 | Example 5 |
|---|---|---|---|---|---|---|
| fineness of multifilament fiber (De) |  | 1750 | 3000 | 1750 | 1750 | 1750 |
| fabric |  |  |  |  |  |  |
| number of warps/ 10 cm |  | 52 | 30 | 52 | 52 | 52 |
| number of wefts/ 10 cm |  | 52 | 30 | 52 | 52 | 52 |
| weight of fabric (g/m²) |  |  |  |  |  |  |
| weight of coated fabric (g/m²) |  |  |  |  |  |  |
| fineness of coated yarn (De) |  | 3820 | 5676 | 4930 | 4136 | 3418 |
| flame retardant for mesh sheets/ multifilament fiber or fabric combustion test |  | 118/100 | 89/100 | 182/100 | 136/100 | 95/100 |
| 1) two minutes or 1 minute of combustion carbonization area (cm²) |  | 7 | 12 | 8 | 9 | 10 |
| afterflame time (seconds) |  | 0 | 0 | 0 | 0 | 1 |
| afterglow time (seconds) |  | 0 | 1 | 1 | 0 | 1 |

TABLE 3-continued

| | solid content % | Example 1 | Example 2 | Example 3 | Example 4 | Example 5 |
|---|---|---|---|---|---|---|
| 2) 6 seconds or 3 seconds after catching fire carbonization area ($cm^2$) | | 8 | 14 | 10 | 8 | 12 |
| afterflame time (seconds) | | 0 | 2 | 1 | 0 | 2 |
| afterglow time (seconds) | | 0 | 3 | 1 | 2 | 1 |
| 3) number of times of flame contact (time) | | 5 | 4 | 5 | 4 | 4 |
| amount of halogen gas (HBr) (mg/g) | | 0 | 0 | 0 | 0 | 0 |
| flexibility | | ⊙ | ⊙ | ⊙ | ⊙ | ⊙ |
| gloss | | ⊙ | ⊙ | ⊙ | ⊙ | ⊙ |
| tensile strength (warp/weft) (kg/3cm) | | 213/215 | 222/225 | 210/211 | 215/212 | 212/214 |
| tensile elongation (warp/weft) (kg/3cm) | | 24/23 | 24/24 | 24/23 | 22/25 | 24/24 |
| toughness (warp/weft) | | 10224/9800 | 10656/10800 | 10080/906 | 9460/10600 | 10176/10272 |
| drop impact strength (penetration test) m | | 7 | 8 | 7 | 7 | 7 |

TABLE 4

| | Example 6 | Example 7 | Example 8 | Example 9 | Example 10 |
|---|---|---|---|---|---|
| fineness of multifilament fiber (De) | | | | 1750 | 1750 |
| fabric | | | | | |
| number of warps/10 cm | 45 | 20 | 120 | 52 | 52 |
| number of wefts/10 cm | 45 | 20 | 120 | 52 | 52 |
| weight of fabric ($g/m^2$) | 225 | 100 | 66 | | |
| weight of coated fabric ($g/m^2$) | 392 | 185 | 117 | | |
| fineness of coated yarn (De) | | | | 3772 | 3984 |
| flame retardant for mesh sheets/multifilament fiber or fabric | 74/100 | 85/100 | 77/100 | 116/100 | 127/100 |
| combustion test | | | | | |
| 1) two minutes or 1 minute of combustion carbonization area ($cm^2$) | 10 | 8 | 11 | 12 | 10 |
| afterflame time (seconds) | 0 | 0 | 1 | 1 | 0 |
| afterglow time (seconds) | 0 | 0 | 1 | 1 | 0 |
| 2) 6 seconds or 3 seconds after catching fire carbonization area ($cm^2$) | 10 | 9 | 12 | 10 | 11 |
| afterflame time (seconds) | 1 | 1 | 2 | 2 | 1 |
| afterglow time (seconds) | 2 | 1 | 2 | 3 | 1 |
| 3) number of times of flame contact (time) | 4 | 4 | 4 | 4 | 4 |
| amount of halogen gas (HBr) (mg/g) | 0 | 0 | 0 | 0 | 0 |
| flexibility | ⊙ | ⊙ | ⊙ | ⊙ | ⊙ |
| gloss | ⊙ | ⊙ | ⊙ | ○ | ○ |
| tensile strength (warp/weft) (kg/3cm) | 216/215 | 92/95 | 62/63 | 212/214 | 213/212 |
| tensile elongation (warp/weft) (kg/3cm) | 23/24 | 24/22 | 24/21 | 23/22 | 23/24 |
| toughness (warp/weft) | 9936/10320 | 4412/4180 | 2976/2646 | 9752/9416 | 9798/10176 |
| drop impact strength (penetration test) m | 7 | 4 | 2 | 7 | 7 |

TABLE 5

| | solid content % | Comparative Example 1 | Comparative Example 2 | Comparative Example 3 | Comparative Example 4 | Comparative Example 5 |
|---|---|---|---|---|---|---|
| Aqueous dispersion resin ethylene-vinyl acetate copolymer | | | | | | |
| V-200 | 40 | 250 | 175 | 125 | 250 | 250 |
| S-752 | 50 | | | | | |
| S-301 | 50 | | | | | |
| ethylene-α-olefin copolymer A-100 | 40 | | 75 | | | |
| polyurethane | | | | | | |
| Viel U-42 | 50 | | | 100 | | |
| Adecabontiter HUX-380 | 38 | | | | | |
| Adecabontiter HUX-350 | 30 | | | | | |
| Adecabontiter HUX-386 | 31 | | | | | |
| aqueous dispersion resin solid content (parts by weight) | | 100 | 100 | 100 | 100 | 100 |
| phosphate TCP | | 0 | 0 | 0 | 10 | 10 |
| phosphate CDP | | | | | | |
| red phosphorus Nova Excel 140 | | 6 | 6 | 6 | 1 | 12 |
| red phosphorus Nova Red 120 | | | | | | |
| ammonium polyphosphate A | | 30 | 30 | 30 | 30 | 8 |
| ammonium polyphosphate B | | | | | | |
| aluminum hydroxide C | | | | | | |
| magnesium hydroxide D | | | | | | |
| decarbromodiphenyl oxide | | | | | | |
| antimony trioxide | | | | | | |
| isopropyl alcohol | | 10 | 10 | 0 | 10 | 10 |
| viscosity of aqueous dispersion (CP) | | 2950 | 3420 | 3270 | 2860 | 2430 |

TABLE 6

|  | Comparative Example 6 | Comparative Example 7 | Comparative Example 8 | Comparative Example 9 |
|---|---|---|---|---|
| Aqueous dispersion resin ethylene-vinyl acetate copolymer | | | | |
| V-200 | 250 | 250 | 250 | 250 |
| S-752 | | | | |
| S-301 | | | | |
| ethylene-a-olefin copolymer A-100 | | | | |
| polyurethane | | | | |
| Viel U-42 | | | | |
| Adecabontiter HUX-380 | | | | |
| Adecabontiter HUX-350 | | | | |
| Adecabontiter HUX-386 | | | | |
| aqueous dispersion resin solid content (parts by weight) | 100 | 100 | 100 | 100 |
| phosphate TCP | 40 | 2 | | 10 |
| phosphate CDP | | | | |
| red phosphorus Nova Excel 140 | 6 | 6 | | 6 |
| red phosphorus Nova Red 120 | | | | |
| ammonium polyphosphate A | 40 | 30 | | 30 |
| ammonium polyphosphate B | | | | |
| aluminum hydroxide C | | | | |
| magnesium hydroxide D | | | | |
| decabromodiphenyl oxide | | | 25 | |
| antimony trioxide | | | 20 | |
| isopropyl alcohol | 0 | 10 | 0 | 10 |
| viscosity of aqueous dispersion (CP) | 1860 | 2880 | 2580 | 2850 |

TABLE 7

| | solid content % | Comparative Example 1 | Comparative Example 2 | Comparative Example 3 | Comparative Example 4 | Comparative Example 5 |
|---|---|---|---|---|---|---|
| fineness of multifilament fiber (De) fabric | | 1750 | 1750 | 1750 | 1750 | 1750 |
| number of warps/10 cm | | 52 | 52 | 52 | 52 | 52 |
| number of wefts/10 cm | | 52 | 52 | 52 | 52 | 52 |
| weight of fabric (g/m²) | | | | | | |
| weight of coated fabric (g/m²) | | | | | | |
| fineness of coated yarn (De) | | 3910 | 5120 | 4390 | 3886 | 3694 |
| flame retardant for mesh sheets/multi-filament fiber or fabric combustion test | | 123/100 | 192/100 | 151/100 | 122/100 | 111/100 |
| 1) two minutes or 1 minute of combustion carbonization area (cm²) | | 9 | 13 | 8 | totally burnt | totally burnt |
| afterflame time (seconds) | | 0 | 1 | 0 | | |
| afterglow time (seconds) | | 0 | 1 | 0 | | |
| 2) 6 seconds or 3 seconds after catching fire carbonization area (cm²) | | 9 | 14 | 9 | totally burnt | totally burnt |
| afterflame time (seconds) | | 0 | 3 | 1 | | |
| afterglow time (seconds) | | 2 | 3 | 1 | | |
| 3) number of times of flame contact (time) | | 5 | 4 | 4 | | |
| amount of halogen gas (HBr) (mg/g) | | 0 | 0 | 0 | 0 | 0 |
| flexibility | | ○ | ○ | ○ | ◎ | ◎ |
| gloss | | ○ | ○ | ○ | ◎ | ◎ |
| tensile strength (warp/weft) (kg/3cm) | | 214/214 | 213/212 | 210/213 | | |
| tensile elongation (warp/weft) (kg/3cm) | | 24/23 | 23/24 | 25/23 | | |
| toughness (warp/weft) | | 10272/9844 | 9798/10176 | 10500/9798 | | |
| drop impact strength (penetration test) m | | 7 | 7 | 7 | | |

TABLE 8

|  | Comparative Example 6 | Comparative Example 7 | Comparative Example 8 | Comparative Example 9 |
|---|---|---|---|---|
| fineness of multifilament fiber (De) fabric | 1750 | 1750 | 1750 | 1750 |
| number of warps/10 cm | 52 | 52 | 52 | 52 |
| number of wefts/10 cm | 52 | 52 | 52 | 52 |
| weight of fabric (g/m²) | | | | |
| weight of coated fabric (g/m²) | | | | |
| fineness of coated yarn (De) | 3667 | 3886 | 4018 | 2557 |
| flame retardant for mesh sheets/multifilament fiber or fabric combustion test | 110/100 | 122/100 | 130/100 | 46/100 |
| 1) two minutes or 1 minute of combustion carbonization area (cm²) | 8 | 8 | 8 | totally burnt |
| afterflame time (seconds) | 0 | 0 | 0 | |
| afterglow time (seconds) | 0 | 0 | 0 | |

TABLE 8-continued

|   |   | Comparative Example 6 | Comparative Example 7 | Comparative Example 8 | Comparative Example 9 |
|---|---|---|---|---|---|
| 2) | 6 seconds or 3 seconds after catching fire carbonization area (cm$^2$) | 7 | 9 | 9 | totally burnt |
|   | afterflame time (seconds) | 0 | 0 | 0 |   |
|   | afterglow time (seconds) | 0 | 1 | 0 |   |
| 3) | number of times of flame contact (time) | 5 | 5 | 5 |   |
|   | amount of halogen gas (HBr) (mg/g) | 0 | 0 | 28 | 0 |
|   | flexibility | XX | ○ | ○ | ⊚ |
|   | gloss | ⊚ | ○ | ⊚ | ○ |
|   | tensile strength (warp/weft) (kg/3cm) | 212/215 | 213/212 | 215/211 |   |
|   | tensile elongation (warp/weft) (kg/3cm) | 25/23 | 23/24 | 23/23 |   |
|   | toughness (warp/weft) | 10600/9890 | 9798/10176 | 9890/9706 |   |
|   | drop impact strength (penetration test) m | 7 | 7 | 7 |   |

(Notes)

(1) The amount of each material is expressed in parts by weight with respect to 100 parts by weight of a resin solid content.

(2) The unit of numerical values of the coated fabrics of Examples 6, 7 and 8 is g/m$^2$.

(3) The fineness of a multifilament fiber×the number of the fibers in Examples 6, 7 and 8 are 750×3, 750×3 and 250×1, respectively.

(4) The combustion tests of Examples 1, 5, 6, 7, 8 and 9 and Comparative Examples 4, 5, 6, 7, 8 and 9 were based on A-1 method in which heating was carried out for 1 minute, and flames were produced after 3 seconds.

(5) A is TERRAJU-60 (manufactured by Chisso Corp.).

(6) B is Hostafuram AP 462 (manufactured by Hoechst Japan Limited).

(7) C is Hijilite H-42M (manufactured by Showa Denko Co.).

(8) D is Kisuma-5 (manufactured by Kyowa Kagaku Co.).

(9) The figures in the column of the fineness (De) of the coated yarn or coated fabric are for coated fabrics in Examples 6, 7 and 8 and coated yarn in other examples.

Measurement Methods of Properties

1. Viscosity measurement method

BM type viscometer rotor No. 6, revolution of 12 rpm, 25° C.

2. Combustion test

Measured in accordance with JIS L-1091

A-1 method (45° C., micro-burner method)

A-2 method (45° C., meckel burner method)

D method (number of times of flame contact)

3. Tensile strength test Measured in accordance with JIS L-1068

4. Amount of HBr gas generated 0.5 g of a sample was taken. This sample was placed in a combustion tube, preheated at 350 to 400° C. for 5 minutes and postheated at 800±30° C. for 30 minutes, and a combustion gas was collected into a flask filled with a 1/10 N NaOH solution. The quantity of HBr contained in the solution was determined by ion chromatography.

5. Drop impact strength (penetration test)

Measured in accordance with JIS-8952.

A steel tube having an outer diameter of 48.6 mm, a thickness of 2.5 mm and a weight of 2.7 kg was used in this test in the case of the flameproof mesh sheet for low houses and the scattering prevention flameproof mesh sheet.

| 6. Flexibility | |
|---|---|
| excellent (soft) | ⊚ |
| good | ○ |
| moderate | D |
| slightly bad (hard) | Δ |
| bad | X |
| sticky | XX |
| 7. Gloss | |
| excellent | ⊚ |
| good | ○ |
| moderate | D |
| slightly bad | Δ |
| bad | X |

The flameproof mesh sheet of the present invention does not generate harmful halogen gas at the time of combustion, and has an excellent flame retarding ability and high drop impact strength.

The disclosure of Japanese Patent Application No. 9-366547 filed Dec. 5, 1997, including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A flameproof mesh sheet which is impregnated with a flame retardant and subjected to heat treatment, wherein the flame retardant comprises 1.5 to 15 parts by weight of red phosphorus, 10 to 50 parts by weight of an ammonium polyphosphate compound, and 3 to 30 parts by weight of an organic phosphate, with respect to 100 parts by weight of the solid content of a halogen-free aqueous dispersion of an ethylene-vinyl acetate copolymer having a vinyl acetate content of 10 to 95 wt % and a resin solid content of 25 to 75 wt %.

2. A flameproof mesh sheet which is impregnated with a flame retardant and subjected to heat treatment, wherein the flame retardant is prepared by mixing a halogen-free aqueous dispersion of an α-olefin copolymer having a solid content of 20 to 45 wt % with a halogen-free aqueous dispersion of an ethylene-vinyl acetate copolymer having a vinyl acetate content of 10 to 95 wt % and a resin solid content of 25 to 75 wt %, in a solid content weight ratio of 10:90 to 70:30, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content.

3. A flameproof mesh sheet which is impregnated with a flame retardant and subjected to heat treatment, wherein the flame retardant is prepared by mixing a halogen-free aqueous dispersion of polyurethane having a solid content of 25 to 70 wt % with a halogen-free aqueous dispersion of an ethylene-vinyl acetate copolymer having a vinyl acetate content of 10 to 95 wt % and a resin solid content of 25 to 75 wt %, in a solid content weight ratio of 10:90 to 90:10, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content.

4. A flameproof mesh sheet which is impregnated with a flame retardant and subjected to heat treatment, wherein the flame retardant is prepared by mixing a halogen-free aqueous dispersion of an α-olefin copolymer having a solid content of 20 to 45 wt % with a halogen-free aqueous dispersion of polyurethane having a solid content 25 to 75 wt % with an aqueous dispersion of an ethylene-vinyl acetate copolymer having a vinyl acetate content of 10 to 95 wt % and a resin solid content of 25 to 75 wt %, in a solid content weight ratio of 10:10:80 to 50:80:10, and adding 1.5 to 15 parts by weight of red phosphorus, 10 to 50 parts by weight of an ammonium polyphosphate compound, and 3 to 30 parts by weight of an organic phosphate, with respect to 100 parts by weight of the total resin solid content.

5. The flameproof mesh sheet as defined in any one of claims 1 to 4, wherein the red phosphorus is micro-capsulated.

6. The flameproof mesh sheet as defined in any one of claims 1 to 4, wherein the anmonium polyphospate compound is micro-capsulated.

7. The flameproof mesh sheet as defined in any one of claims 1 to 4, wherein the organic phosphate is an organic does not contain elemental halogen.

8. The flameproof mesh sheet as defined in any one of claims 1 to 4, wherein said flame retardant further comprises 30 to 150 parts by weight of a metal hydroxide with respect to 100 parts by weight of the solid content of the aqueous dispersion resin of the flame retardant.

9. The flameproof mesh sheet as defined in claim 8, wherein the metal hydroxide is magnesium hydroxide and/or aluminum hydroxide.

10. A flameproof mesh sheet as defined in any one of claims 1 to 4, wherein said mesh sheet is woven out of coated yarn which is impregnated with the flame retardant and subjected to heat treatment.

11. The flameproof mesh sheet as defined in claim 10, wherein the coated yarn comprises a multifilament fiber having an equivalent single fineness of 3 to 17 denier, a total fineness of 500 to 4,500 denier, a tensile strength of 4 to 10 g/denier and an elongation of 14 to 45% at a point of rupture.

12. A flameproof mesh sheet as defined in any one of claims 1 to 4, wherein said mesh sheet is prepared by impregnating a mesh sheet fabric woven out of multifilament fibers with the flame retardant and heating the mesh sheet fabric.

13. The flameproof mesh sheet as defined in claim 12, wherein the mesh sheet fabric woven out of multifilament fibers is prepared by paralleling 1 to 4 synthetic fibers having an equivalent single fineness of 2 to 13 denier, a total fineness of 150 to 2,500 denier, a tensile strength of 4 to 10 g/denier and an elongation of 14 to 45% at a point of rupture, and leno weaving or mock leno weaving the synthetic fibers with a weaving machine, said mesh sheet fabric having a mesh size of 10 to 140 warps/10 cm and 10 to 140 wefts/10 cm.

14. A flameproof mesh sheet as defined in any one of claims 1 to 4, wherein the flame proof mesh sheet is formed from a multifilament fiber or a mesh sheet fabric woven out of multifilament fibers, which is impregnated and coated with the flame retardant, such that 60 to 350 parts by weight of the flame retardant is contained with respect to 100 parts by weight of the mesh sheet fabric, said flameproof mesh sheet being woven from coated yarn that is impregnated and coated with said flame retardant for mesh sheet, and subjected to heat treatment.

15. The flameproof mesh sheet as defined in claim 14, wherein the mesh sheet fabric woven out of the multifilament fibers is prepared by paralleling 1 to 4 synthetic fibers having an equivalent single fineness of 2 to 13 denier, a total fineness of 150 to 2,500 denier, tensile strength of 4 to 10 g/denier and an elongation 14 to 45% at a point of rupture, and leno weaving or mock leno weaving the synthetic fibers with a weaving machine, said mesh sheet fabric having a mesh size of 10 140 warps/10 cm and 10 to 140 wefts/10 cm.

* * * * *